United States Patent [19]

Daems et al.

[11] Patent Number: 5,222,183
[45] Date of Patent: Jun. 22, 1993

[54] SPLICE CASE FOR OPTICAL FIBRE CABLE

[75] Inventors: Daniel Daems, Berchem; Patrick Clits, Houwaart, both of Belgium; Marc Moisson, San Carlos, Calif.; Jean-Marie E. Nolf, Korbeek-lo, Belgium

[73] Assignee: N.V. Raychem S.A., Belgium

[21] Appl. No.: 681,548

[22] PCT Filed: Nov. 7, 1989

[86] PCT No.: PCT/GB89/01326

§ 371 Date: May 7, 1991

§ 102(e) Date: May 7, 1991

[87] PCT Pub. No.: WO90/05318

PCT Pub. Date: May 17, 1990

[30] Foreign Application Priority Data

Nov. 7, 1988 [GB] United Kingdom ............... 8826062

[51] Int. Cl.⁵ .............................................. G02B 6/44
[52] U.S. Cl. .................................................. 385/135
[58] Field of Search ............... 385/135, 136, 137, 138

[56] References Cited

U.S. PATENT DOCUMENTS

| 4,266,853 | 5/1981 | Hutchins et al. | 350/96.20 |
| 4,373,776 | 2/1983 | Prudy | 350/96.20 |
| 4,627,686 | 12/1986 | Szentesi | 350/96.20 |
| 4,679,896 | 7/1987 | Krafcik et al. | 350/96.20 |
| 4,687,289 | 8/1987 | Desanti | 350/96.20 |
| 4,913,522 | 4/1990 | Nolf et al. | 385/135 X |
| 5,007,701 | 4/1991 | Roberts | 385/135 |

FOREIGN PATENT DOCUMENTS

| 0043570B1 | 4/1984 | European Pat. Off. |
| 0159857 | 10/1985 | European Pat. Off. |
| 0077115 | 4/1986 | European Pat. Off. |
| 0213365 | 7/1986 | European Pat. Off. |
| 0159857B1 | 7/1990 | European Pat. Off. |
| 3006131A1 | 9/1981 | Fed. Rep. of Germany |
| 3706518 | 9/1988 | Fed. Rep. of Germany |
| 52-13346 | 1/1977 | Japan |
| 55-127508 | 2/1980 | Japan |
| 55-127507 | 10/1980 | Japan |
| 55-100504 | 7/1990 | Japan |
| 1604981 | 12/1981 | United Kingdom |
| 1604985 | 12/1981 | United Kingdom |
| 2124439B | 2/1984 | United Kingdom |
| 2176024 | 12/1986 | United Kingdom |

Primary Examiner—Akm E. Ullah
Attorney, Agent, or Firm—Herbert G. Burkard; A. Stephen Zavell

[57] ABSTRACT

An enclosure capable of enclosing a butt splice between at least two optical fibre cables, which comprises: a base through which respective cables can pass; at least one optical fire organizer capable of storing an optical fibre in the path from one of the outlets to another of the outlets, said path having a minimum radius of curvature no smaller than the minimum bend radius of said optical fibre; and a hollow cover which can surround the organizer and which can be fixed to the base to close the enclosure; the base being removable from the splice by sliding over the organizer.

15 Claims, 11 Drawing Sheets

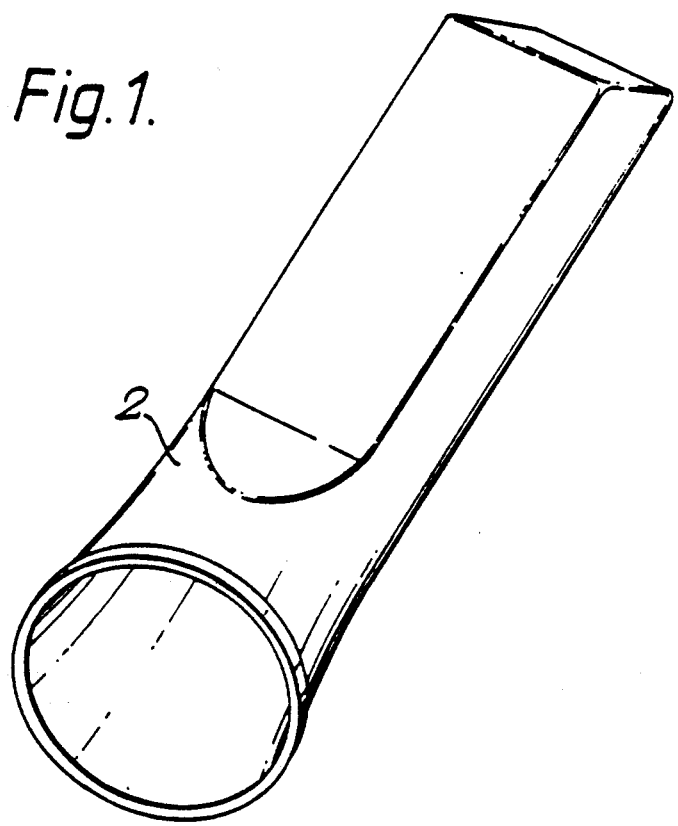
Fig.1.
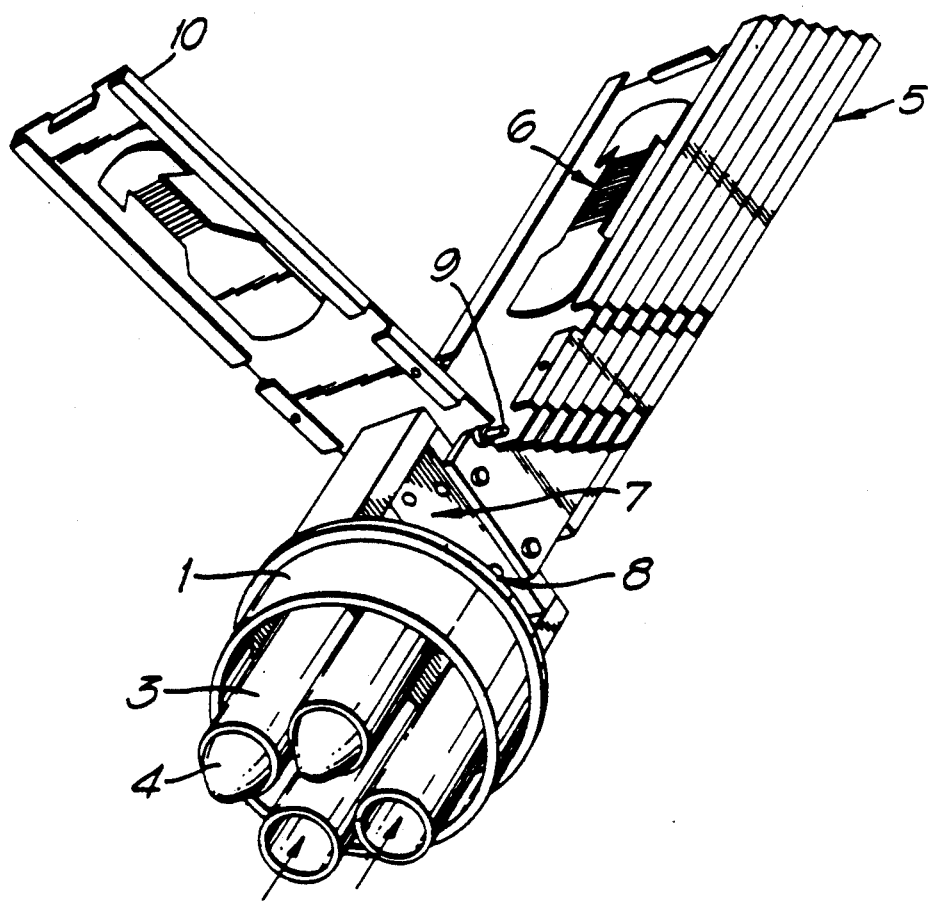

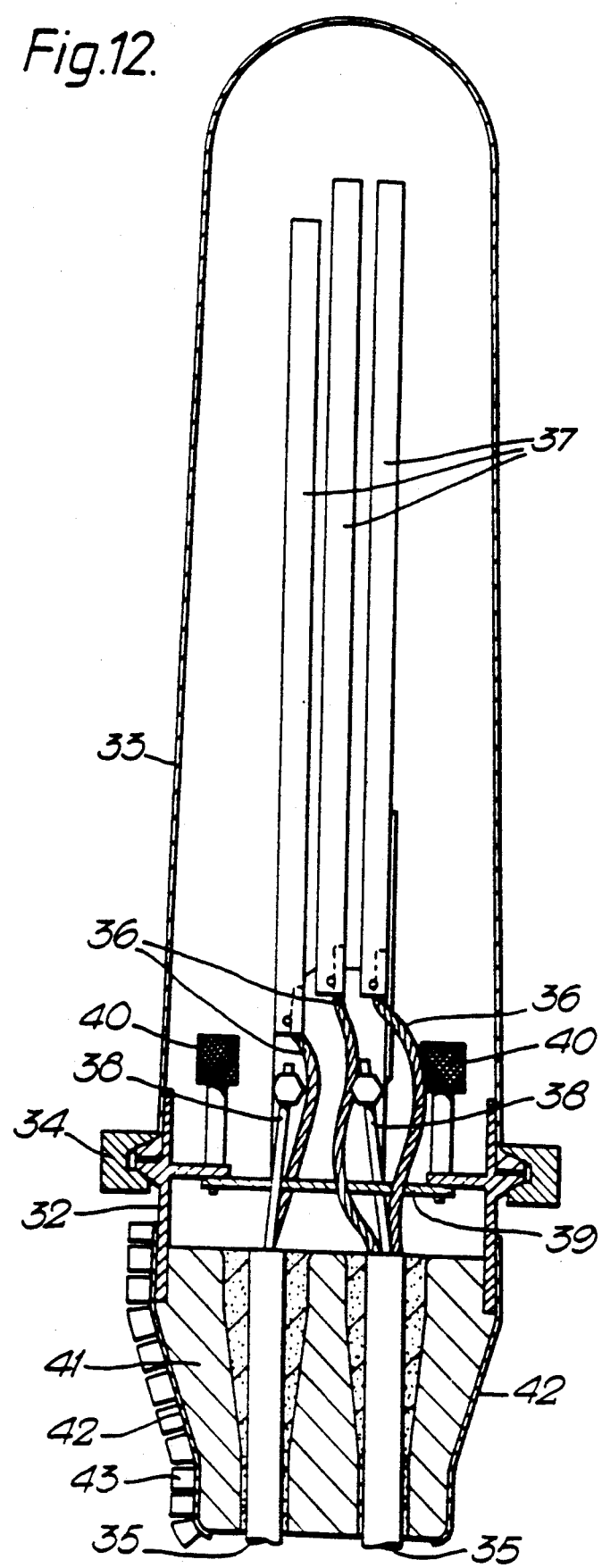

SPLICE CASE FOR OPTICAL FIBRE CABLE

The present invention relates to the provision of an environmental seal around a splice in one or more optical fibre cables.

Optical fibre cables comprise a bundle of optical fibres surrounded by a protective jacket. Since such cables are manufactured in finite lengths, any installation will in general require separate lengths of cable to be spliced together. A problem arises at the splice, not only in forming fibre splices of low light attenuation, but also in replacing the protective jacket which has to be removed in the region of the splice to expose the fibres. It is with this second problem that the present invention is concerned, Splicing an optical fibre is a difficult business, requiring use of a machine for proper alignment of pairs of fibres before a permanent splice is made between each pair. The machine will of necessity be some short distance away from the ends of the intact portions of the cables to be joined, i.e. some distance from the ends of each cable jacket. The jacket of each cable to be joined may be stripped back a distance of, say, 1.5 m thereby exposing 1.5 m of optical fibres. It can be seen, therefore, that there is a further problem, namely the accomodation of a significant length of optical fibres within the environmental housing which is to replace the removed portions of cable jacket. Optical fibres are easily broken by being bent around too sharp a radius, and the housing must therefore provide some way of organizing the fibres along an acceptable path.

There are some further considerations. It will generally be desirable that any chosen fibre within the housing is accessible, and therefore the fibres, which may number hundreds, should be organized within the housing in a regular fashion. Also, some means of identifying each fibre is desirable, and such means may have to be by way of its location within the housing since colour coding of the fibre itself is difficult.

Various suggestions have been proposed for an optical fibre splice case which organizes the slack lengths of fibres and provides an environmentally sealed housing around them.

In European patent publication 0043570 there is proposed an optical fibre splice case through one side of which one cable enters and through an opposite side of which another cable enters. The ingoing cables are sealed to inlets of the case by shrinkable sleeves. Within the case is a series of plates, each with projections thereon around which are wound the spliced fibres, thereby storing the slack lengths in a path which does not result in damage to the fibres. Such a splice case is known as an in-line splice case (as opposed to a butt splice case) since the cables enter the case from opposite ends, or at least from widely spaced positions.

A similar series of plates for use in an in-line cable splice is disclosed in U.S. Pat. No. 4,266,853. Here the plates are stacked one on top of another and are hinged to a carrier. The hinging allows a chosen plate to be revealed for attention to a fibre splice it carries.

Optical fibre cables may be, for example, buried, or aerial, suspended between poles. In each case in addition to providing environmental protection, some mechanical strength has to be provided, and particular attention has to be given to axial pull strength in the case of aerial installations. Many of the prior art designs provide for axial pull strength in the following way.

The cables themselves may be provided with a steel wire core, around which the fibres are located. In addition to preventing excessive bending of the cable, the core can be used to transmit axial load through the splice case, thus eliminating axial load on the fibres themselves. The way this is done is to strip back the jacket of each cable in the usual way to expose sufficient lengths of fibres for the splicing process to be carried out. The metal core of one cable is then clamped to one end of the splice case and the core of the other cable is clamped to the opposite end of the splice case. Thus, any axial load is transmitted from one core in a line through the case to the other core. Such an arrangement is disclosed in European Patent Publication No. 0077115.

Various other designs for optical fibre splice cases are disclosed in DE 3006131, JP-A-55-127508, JP-A-55-127507, JP-A-55-100504 and JP-A-52-133146.

Although most of the designs proposed in the prior art are likely to be satisfactory each has a disadvantage. The splice cases tend to be bulky, difficult to remove from a manhole or pole where they are located, and difficult to re-enter for repair or testing. We have discovered that these problems can be overcome by a simple modification to the arrangement of the cables and organizer plates.

The invention in EP0159857 (Raychem) provides an enclosure capable of enclosing a butt splice between at least two optical fibre cables, which comprises:

a base having at least two mutually adjacent outlets capable of receiving respective cables;

at least one optical fibre organizer attachable to the base and capable of storing a plurality of optical fibres, each of said fibres describing a path from one of the outlets to another of the outlets, said path having a minimum radius of curvature no smaller than the minimum bend radius of said optical fibre; and a hollow cover which can surround the organizer and which can be fixed to the base to close the enclosure, preferably by sliding over the organizer axially with respect to the cables entering the base.

An enclosure of this design can be made easy to re-enter because an end (i.e. the cover), rather than a middle portion, of the assembly can be removed. This is because the cables to be spliced enter the assembly from one end. The assembly can be of substantially tubular design of small diameter and length, the design of the internal organizer can be simplified, and a temporary seal (e.g. over night during a lengthy installation) around the organizer can be made using the cover rather than a wrap-around sheet. Furthermore, the assembly can be easily removed from a man-hole or pole. This is because sufficient free cable will be available due to one of the ingoing cables having been bent in a curve in order to enter the assembly. (Imagine two horizontal cables to be spliced; one enters the assembly directly, and the other will curve through a semi-circle to enter the same end of the assembly.) If an in-line cable splice is used, there is either no cable slack at all and the splice cannot be moved; or the cable needs to curve at both ends requiring a larger man-hole or more extensive cable pole fixings.

The base preferably comprises a plate having two or more outlets, either as simple apertures or as tubular projections, and the cover preferably is generally cylindrical with one closed end, for example dome-shaped. The base plate mates with the open end of the dome to provide the hollow article. Some means of holding the two parts together will preferably be provided, although the two parts may simply be an interference fit. Examples of means for holding them together include screw-threads on the two parts, bayonet fixings on the two parts, catches on the two parts, a separate clamp, and a separate sealing band for example a heat-shrinkable or otherwise recoverable band. Mechanical holding of the two parts may be combined with some environmental sealing means such as a gasket, O-ring, mastic seal or adhesive bond. An adhesive bond could be used in the absence of any mechanical fixing.

The base is preferably so constructed to allow core blocking of the cables that pass through it. This may be done by providing a reservoir or means for constructing a reservoir into which an encapsulant can be pored or pumped. A portion of each cable stripped of its outer jacket passes through the reservoir such that introduction of an encapsulant, which may cure or otherwise solidify, provides core blocking or further seals the cable outlet, or screens the spliced fibres from any metal work present.

The outlets are preferably in the form of tubes protruding from the base (or other part) of the hollow article, and means is preferably provided for environmentally sealing the outlets to the cables that pass through them. For example, a clamp, such as a hose clamp, could be used around the tubular outlets. A second possibility is to provide an adhesive, a mastic, or other sealing material between the cables and the outlets. We prefer, however, that the outlets be heat-shrinkable or otherwise recoverable since a tight seal can thus be made between any given outlet and a wide variety of sizes of cables. Heat-recoverability may of course be used in conjunction with a sealing material such as a heat-activatable adhesive.

In general, the two or more outlets may be provided in two basic ways. Firstly they may be independent in the sense that the base (or other part) of the hollow article is moulded or otherwise formed with tubular outlets projecting therefrom at two or more separate positions. In a second technique one (or more) large outlet is provided on the hollow article, which is subsequently divided into the requisite number of smaller outlets; or, what may amount to the same thing, means is provided to obviate the re-entrant gaps that would otherwise provide leak paths between the two or more cables and the large conduit that carries them. This may be done either by providing a flexible seal around the two or more cables to change their combined re-entrant cross-sectional shape into a generally circular shape compatible with that of the outlet, or by using a branch-off clip (such as that disclosed in GB 1604981 or 1604985) to deform the outlet to match the cross-sectional shape of the cables. (These techniques are illustrated in the drawings.)

Whether or not independent conduits or a divided large conduit is used, a seal is preferably made or enhanced by the conduits or conduit being recovered into engagement with the cable or cables. Recovery is preferably brought about by heat. Heat may be supplied by a torch or a hot-air gun although neither of them can supply heat sufficiently locally to recover easily one only of several independant conduits. We prefer therefore to provide self-contained heating means, and the invention thus also provides an optical fibre splice case comprising: a hollow article having recoverable cable outlets with self contained heating means; and an optical fibre organizer.

The self-contained heating means preferably comprises an electrical heating means such as a resistive heating wire or a conductive polymer composition. We prefer that the electrical heating means is self-regulating with respect to temperature, and this may be achieved by using as the heater a polymeric composition loaded with a filler such as carbon to give a positive temperature coefficient of resistance. The heater may be a discrete heater in thermal contact with the recoverable outlets, or it may be integral with the outlets. Additionally or alternatively, the heater may have the function of activating a heat-activatable sealing material such as a hot-melt adhesive for further environmental sealing or engagement.

A preferred design of the optical fibre organizer will now be considered. The organizer preferably comprises one or more trays on each of which may be stored a length of one or more optical fibres. For example, an organizer may have 5 to 10, preferably about 8 to 10, trays, and each tray may store 5-24, preferably about 10 or 12, optical fibres. An optical fibre cable enters the assembly through one outlet, intermediate lengths of the fibers it contains are stored on the trays, and the cable leaves the assembly through another of the outlets. Since the primary function of the assembly is to house a cable splice, each tray will also hold the fibre splices themselves. A fiber splice may be made in a small transparent tube into each end of which is inserted one of the two fibres to be spliced. The tube contains a curable composition, which is caused to set once the fibres have been correctly aligned therein. The trays may be provided with means such as recesses or clips to hold these fibre splice tubes. The assembly of the invention may also be used to house an intermediate section of a cable, where the jacket has been removed for testing or access, and where no fibre splices are present.

The trays are preferably stacked one on top of another and attached in that configuration to a carrier which may be attached to or integral with the base or other part of the enclosure. The attachment should be such that any chosen tray may be removed or exposed in order to attend to an optical fibre it carries.

We prefer that the trays are rectangular and are attached by means of a short side to a base of the enclosure. The trays may be hinged in order that they can be rotated away from the splice closure axis. In particular they may be hinged along an edge, preferably a short edge, so as to be moveable to expose an underlying tray. The trays then extend lengthways away from the base and are covered by the cover. The trays should be made as small as possble consistent with the fibres they carry following a path having a minimum radius of curvature equal to the minimum bend radius of the fibres in question. Preferably the path is no smaller than the permanent bend radius of the fibres. The length of each tray will depend on the length of each fibre that is required for the splicing operation to be carried out and this will depend on the splicing technique. Also each fibre may be wound around its path on the organizer two, three or more times, thus increasing storage by factor of two, three or more. The extent to which this can be done will depend on the number of fibers to be stored on each tray and on the number of trays compared to the desired size of the assembly.

The path that each fibre follows on each tray is not critical, but for best use of space it will pass as close to each long edge as possible. A preferred path will therefore be oval, or rectangular with rounded short edges. Small pegs or other protrusions may be provided on each tray around which the fibres may be wound. The trays preferably have raised edges or rims to maintain a certain separation between them and to prevent fibre spillage from their edges. Each fibre preferably enters a tray along one long edge and leaves that tray from the opposite long edge. This arrangement allows shorter trays and better fibre organization than an alternative where the fibres enter and leave along the same long edge. In the case of a cable splice, the fibres will in general enter and leave each tray across the same short edge. An advantage of them entering across the same edge is that a space where the fibre bundles diverge from each cable to the various trays is only required at one end of the set of trays. Thus the splice case is shorter. If they entered across opposite short edges not only would the splice case be longer, it would also be of greater diameter due to the need for the fibre bundles to bend within the case and pass back down the case to pass through the outlets due to the overall butt-nature of the splice. This can only be avoided using an in-line splice.

The difficulty of making a splice between two optical fibres, and the need for a special splicing device were mentioned above. The entire operation of locating the cables to be joined, performing a large number of splices, storing the spliced fibres, and then environmentally sealing the resulting splices is quite complex. We have developed an apparatus for simplifying this procedure in the field, which locates in the preferred relationship all of the articles required.

The present invention provides a butt splice enclosure that is removable from the splice, without severing the spliced conductors. This may be achieved, in general, by providing components of the closure of the correct size relative to one another (and relative to the splice itself) that they can be slid past one another and longitudinally off the end of the splice. Alternatively, or additionally, one or more of the components may be of so-called "wraparound" design, i.e. have a split periphery and can therefore be removed from the splice laterally with respect to the cables. Since such a split periphery is likely to result in a leak path into the closure, any components with a split periphery are preferably provided within a tubular (i.e. non-split) component that can be removed by longitudinal sliding of the end of the splice.

In one embodiment, the invention provides an enclosure capable of enclosing a butt splice between at least two optical fibre cables, which comprises:

a base through which respective cables can pass:

at least one optical fibre organizer capable of storing an optical fibre in a path from one of the outlets to another of the outlets, said path having a minimum radius of curvature no smaller than the minimum bend radius of said optical fibre; and a hollow cover which can surround the organizer and which can be fixed to the base to close the enclosure; the base being removably from the splice by sliding over the organizer.

The invention is further illustrated with reference to the accompanying drawings, in which:

FIG. 1 shows a partially dismantled prior art butt splice case of the invention;

FIGS. 2(a) and (b) shows bases for a prior art optical fibre splice case;

Figure 8A:
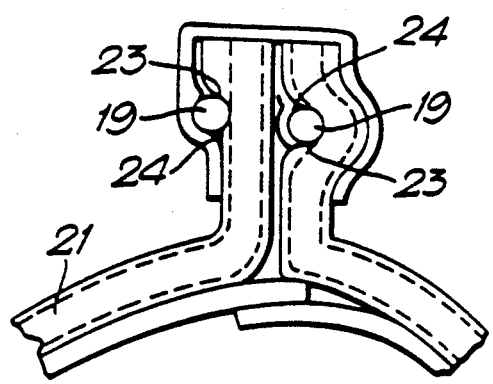
Figure 9A:
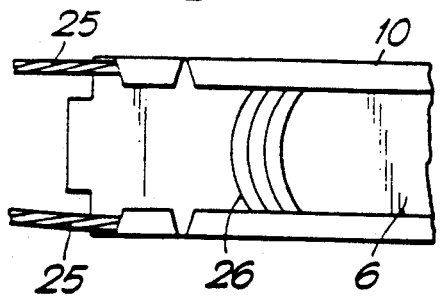
Figure 10A:
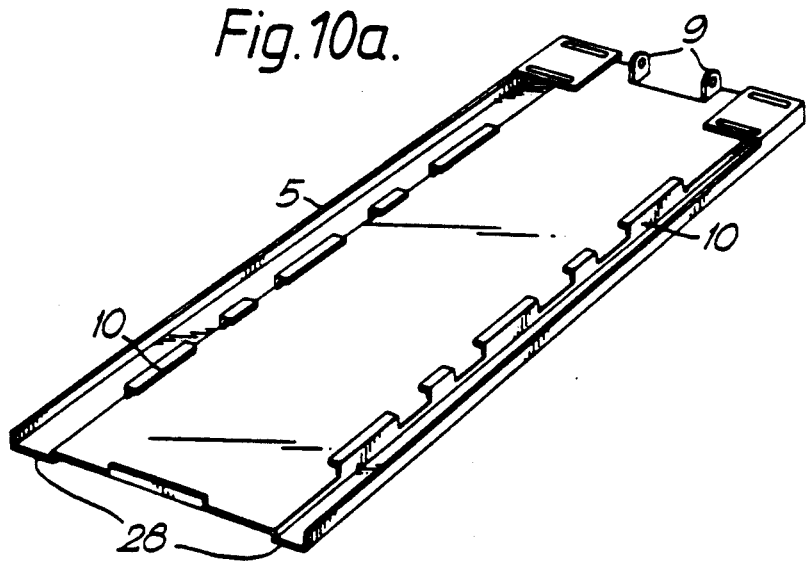
Figure 11A:
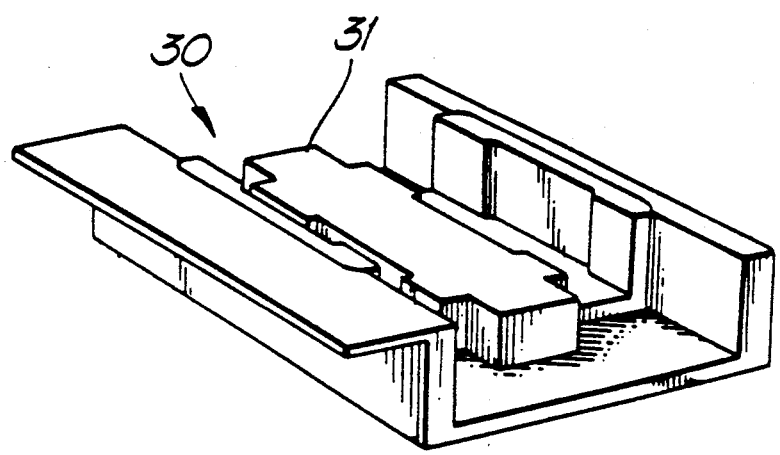

FIGS. 8(a) and (b) shows construction of prior art electrically recoverable outlets;

FIGS. 9(a) and (b) illustrates fibre arrangements on prior art trays of an optical fibre organizer;

FIGS. 10(a) and (b) shows a prior art tray;

FIGS. 11(a) and (b) shows a prior art splice holder; and

Figure 13:
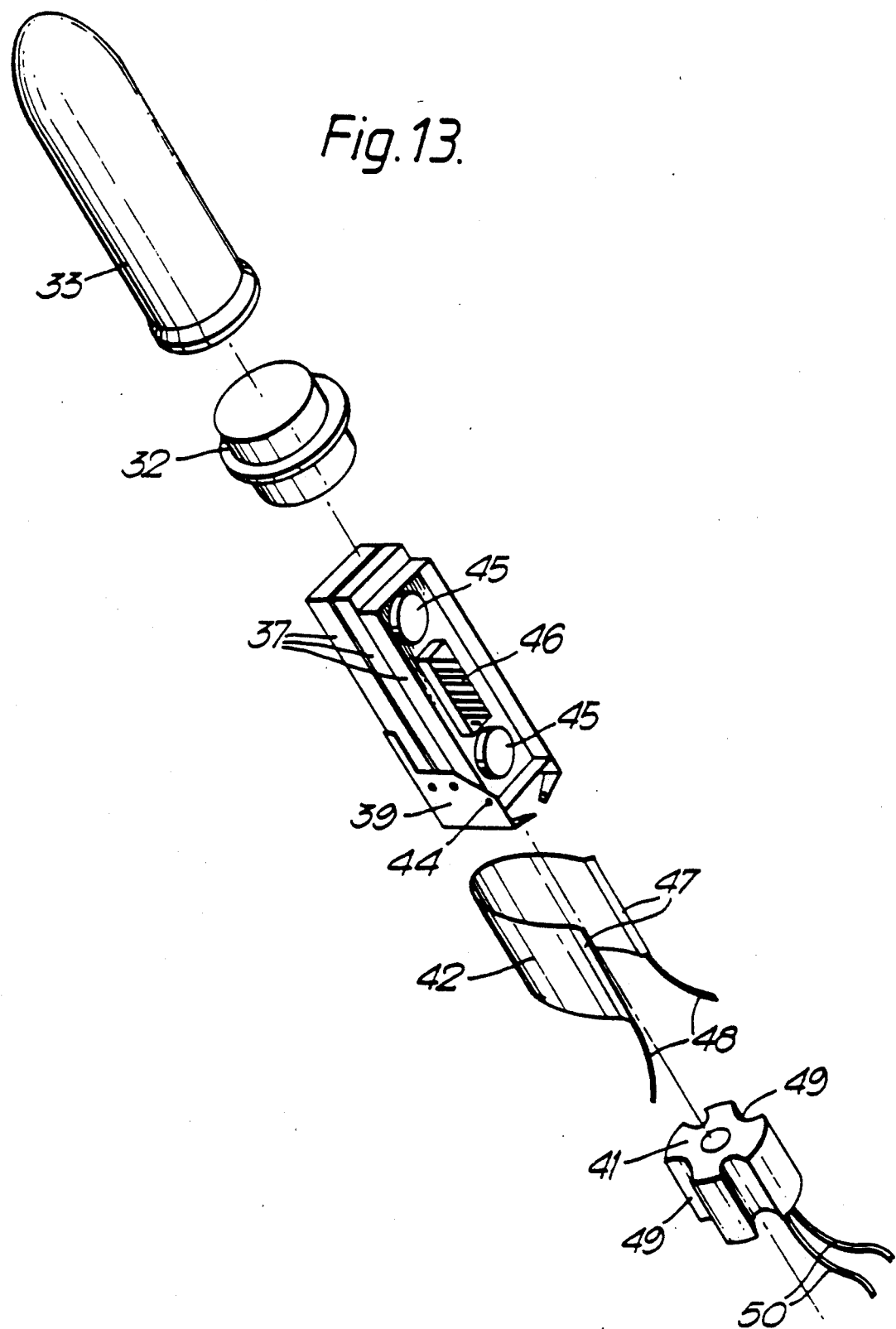
Figure 14:
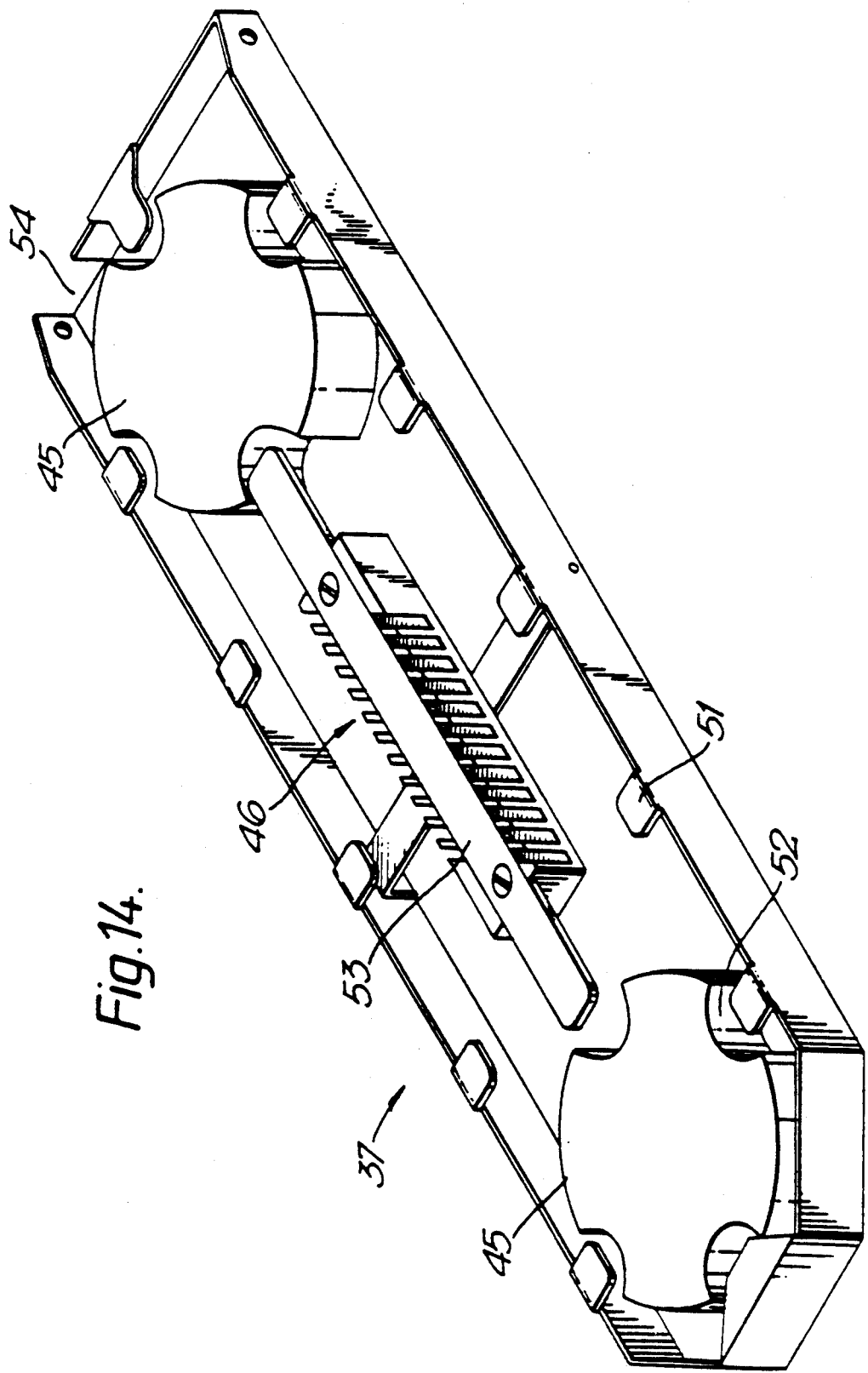

FIGS. 12-14 show enclosures of the invention.

FIG. 1 shows a base plate 1 and a dome-shaped cover 2 which together form an enclosure for use as a butt splice case for optical fibre cables. The base 1 is preferably manufactured by moulding from a glass-fibre filled high density polyethylene. Outlets 3 are provided in the base through which the cables pass. On a new installation, some only of the outlets 3 may be required, and some may therefore be temporarily blocked as shown at 4. Such blocking may be by any suitable means, but we prefer that the outlets be made with closed ends which are simply cut off as required. The dome-shaped cover may be blow-moulded and incorporate a moisture-vapour barrier such as a metal foil.

The hollow article contains an optical fibre organizer which comprises a series of trays 5. Each tray preferably includes means 6 for accomodating splice tubes which house the fibre splices. The trays are preferably held in an orderly fashion on a carrier 7 which is fixed to the base 1. The trays are shown hinged along their short edges, but other hinging for example pivoting for rotating e.g. about one corner in the plane of the trays could be provided. The hinging allows chosen trays to be exposed for installation of the splices or for repair etc. Means is preferably also provided for locking the trays in their hinged position.

The assembly of the invention may be used as follows. Firstly, pass the two cables to be spliced in the direction of the arrows through two of the outlets 3 such that, say 1.5 m of each cable protrudes into the splice case. The cable jackets are then removed back to the base 1 to expose 1.5 m of fibres. The strength core of each cable is then cut back, leaving enough remaining for it to be fastened into respective fastening holes 8. Each fibre of one cable is then spliced to the correct fibre of the other cable. Groups of say ten or twelve spliced fibres are then stored on each tray. When one tray is filled it is moved by hinging at 9 to expose another tray. Each tray preferably has a rim 10 to ensure a sufficient separation between adjacent trays and/or to prevent fibre slippage from each tray.

In FIG. 1 the outlets 3 are shown as independant tubular projections, which are preferably produced by moulding integrally with the base. The outlets are preferably heat-shrinkable in order that seals can be made to the cables they carry.

Figure 2A:
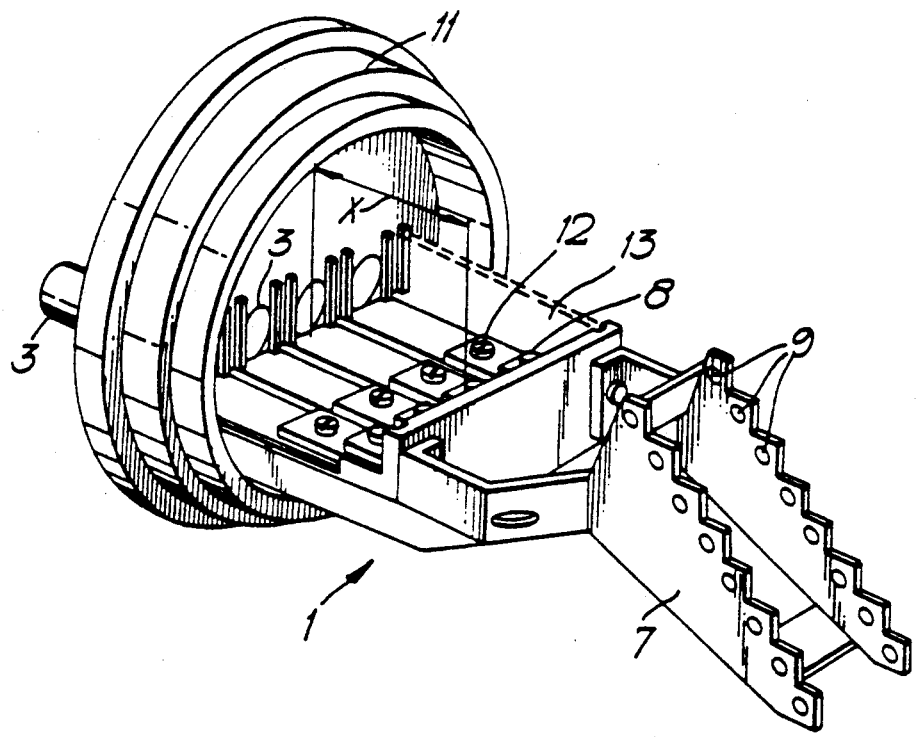

The base 1 shown in FIG. 2a is novel and has some additional or alternative features to that shown in FIG. 1. This base 1 comprises a moulded or otherwise formed part 11 to which is attached a carrier 7 to which trays may be hinged at positions 9. Cables enter the base through outlets 3. Provision is made for connecting (mechanically and/or electrically) a central core of the cable and/or a cable shield or outer strength member (for example a braid or tape wrap): the central strength member can be attached to connections 8 and the outer strength member (or shield) to connections 12. A connection 8 and connection 12 may be provided for each cable.

The base is so constructed that core blocking of the cables can be provided. A certain length of cable jacket is removed so that, when the cable is inserted through an outlet 3, the cable core is exposed over at least part of the distance X shown in the Figure.

A reservoir may be provided by plates or other means 13 which can be attached, for example by positioning in grooves on the base. An encapsulant may then be poured or forced into the reservoir to block the cable or to form a further seal at the cable outlet (i.e. in addition to the sleeves 3) or to protect the interior of the splice case from any metal work present (metal may cause liberation of hydrogen which can damage optical fibres).

Figure 2B:
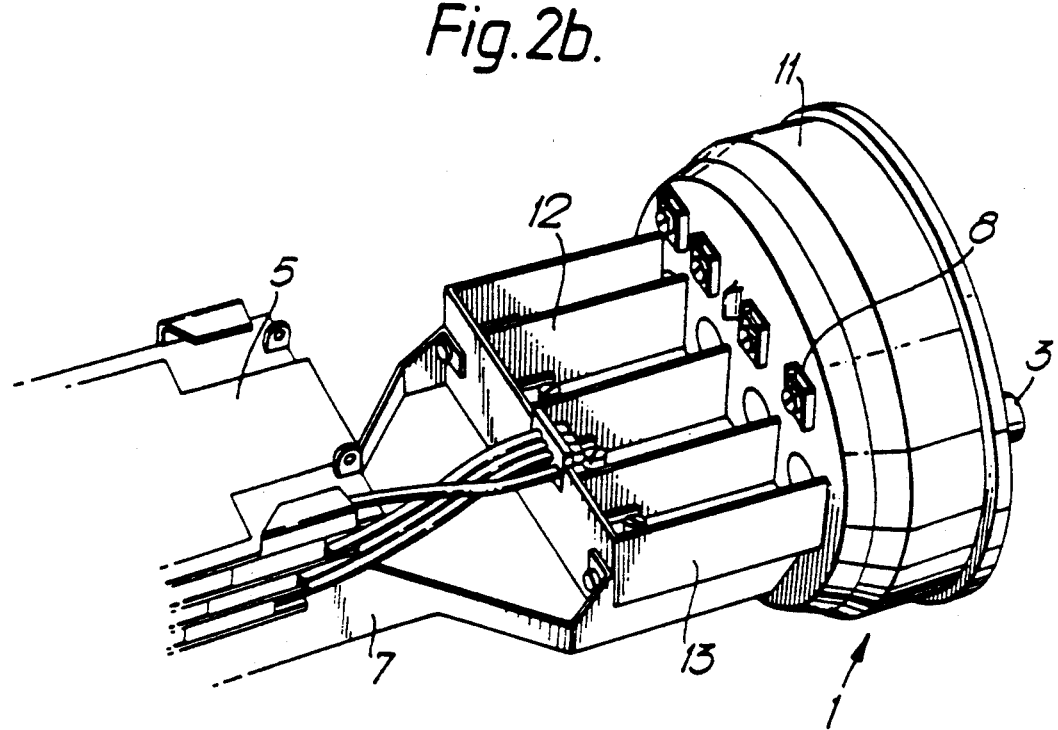

A further novel variation is shown in FIG. 2b, which shows several partially drawn trays 5 attached to a base 1 comprising a moulded part 11 and a carrier 7. In this embodiment connectors 8 for cable shielding or for outer strength members are attached to the moulded part. This can provide easy cable installation and easy fibre access. The dotted lines between connectors 8 indicate an electrically conductive strip between them that can be severed for example where it is shown pleated to isolate the two connectors at the left from the two at the right.

The tray partially shown, more fully shown in FIG. 10, is of a design that allows the tray size to be minimized. Such trays can preferably hold splices of, say, 7.2 mm in width. Bend radii of at least 4.4 cm can easily be accomodated, allowing storage of monomode fibres.

In FIG. 2b a single means 13 provides reservoirs for encapsulant for all of the cables simultaneously. Such means may be an integrally moulded part of the base.

A termination system is provided to aid branching of fibres or groups of fibres from the incoming cable to respective trays. The termination system illustrated comprises a series of tubes into which fibres can be fed running from the base to respective trays. The tubes may be held in groups (of say four) on a part of the base by a clip as shown.

The bases of FIGS. 2a and 2b may be used in in-line splice cases.

Figure 3:
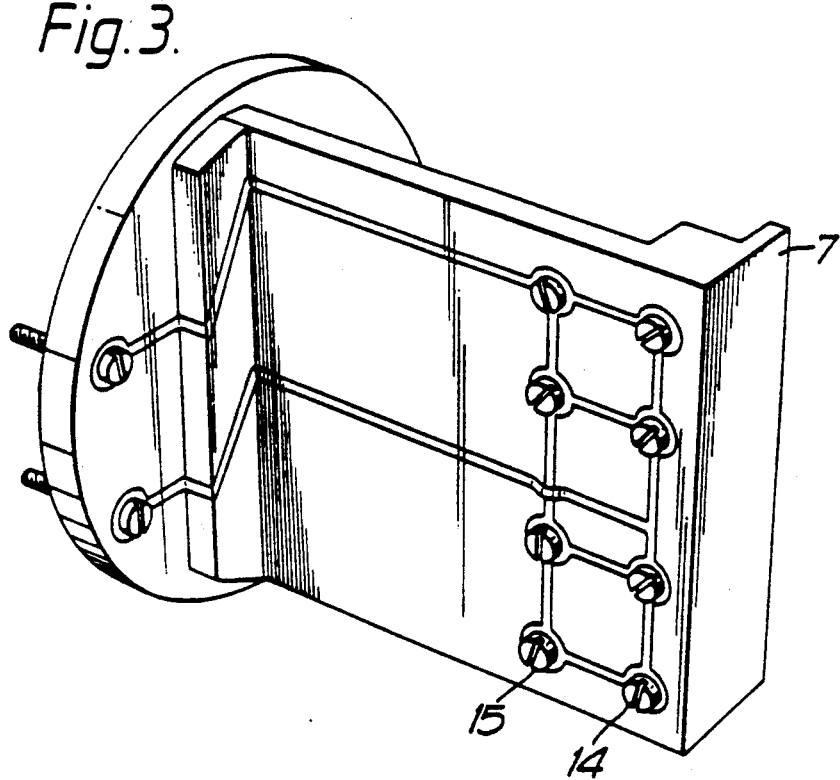
FIG. 3 shows electrical connections to the base of FIG. 2.

FIG. 3 shows an underneath view of the bases shown in FIG. 2. Electrical connections are shown to the sets of contacts 14 and 15. The connections are made such that selective cutting of them can result in any of the following: all cable central conductors and shields connected to the same point (or points); central conductors plus shields of respective cables to different points 3; and all central conductors to one point, and all shields to another point.

Figure 4:
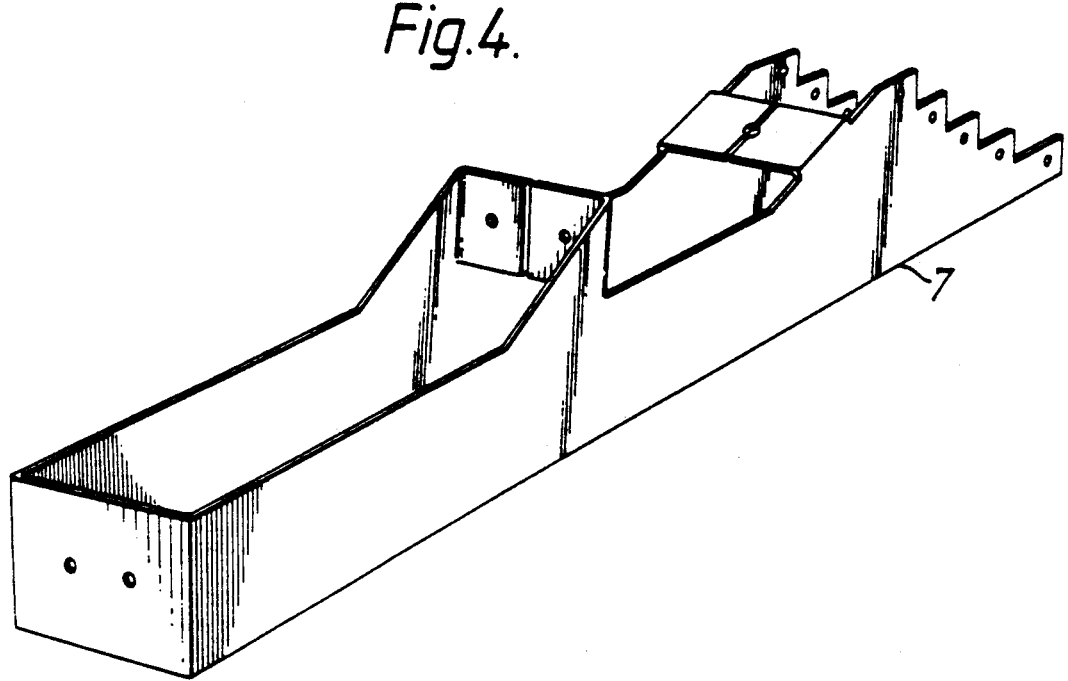
FIG. 4 shows a part of a prior art base for holding trays.

FIG. 4 shows a design of carrier 7 made from sheet material.

Figure 5:
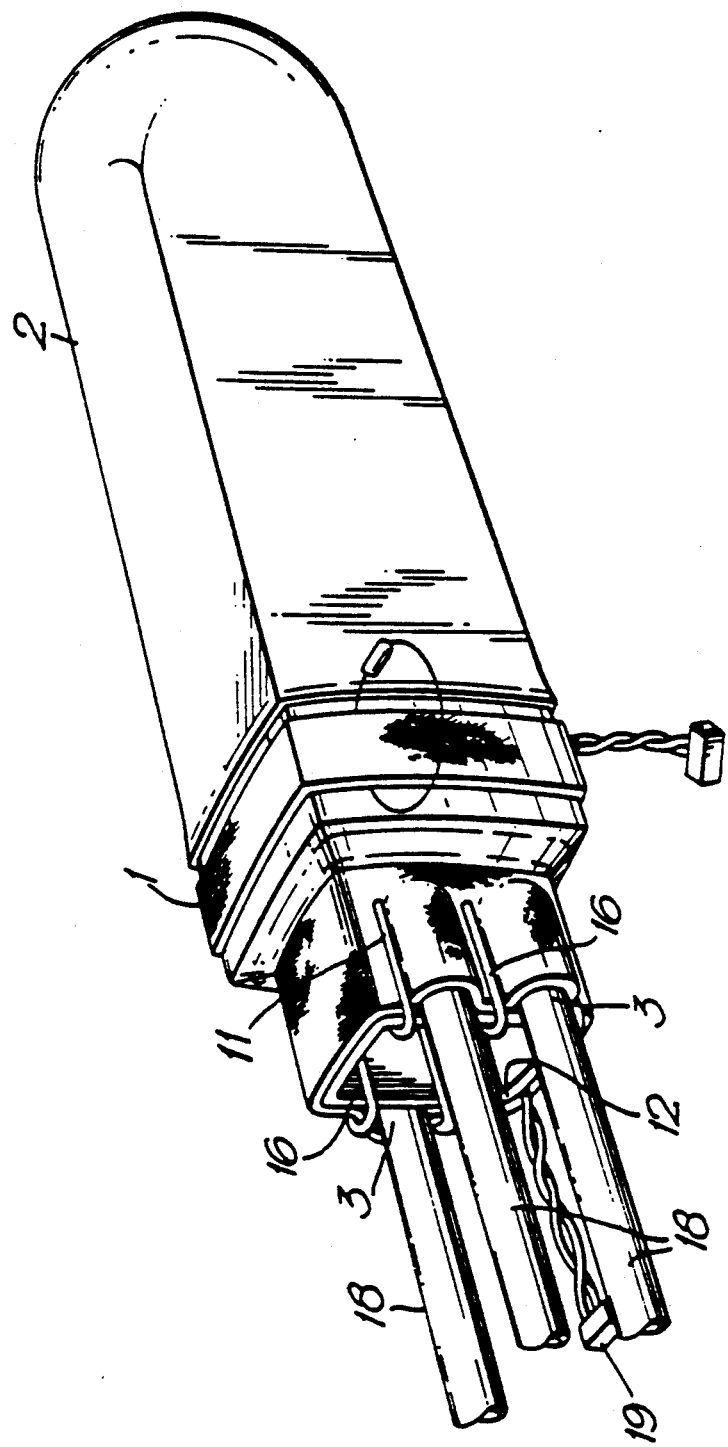
FIG. 5 shows a prior art butt splice case employing branch-off clips and a junction box.

An alternative technique from that of FIG. 1 of sealing the cables at their points of entry is shown in FIG. 5. A series of branch-off clips 16 is used in conjunction with a junction box 17 to deform the outlet 3 to conform to the cables 18. The junction box is positioned within the outlet 3 and the cables pass between the box and the outlet. The branch-off clips cause the outlet to be deformed around the cables into proximity with the box. The outlet is again preferbly heat-shrinkable. FIG. 5 shows a further preferred feature which may be used in any of the embodiments; the outlet 3 is shrinkable by self-contained heating means, particularly by an electrical heater which is shown powered via conductors 19. Also shown is a band which joins together base and dome portions of the splice case. This band, which may also be electrically heat-shrinkable, is provided with self-contained cutting means for re-entry into the splice case. A disadvantage of the use of one outlet 3 which is subdivided is that all cables are preferably installed in that outlet before recovery can be used to seal any of them. The independent outlets illustrated in FIG. 1 allow independent sealing of each cable, and therefore an initial partial installation, followed by addition of further cables at a later date. The embodiment of FIG. 5 could, however, be modified to allow for this by the use of blank plugs.

Figure 6:
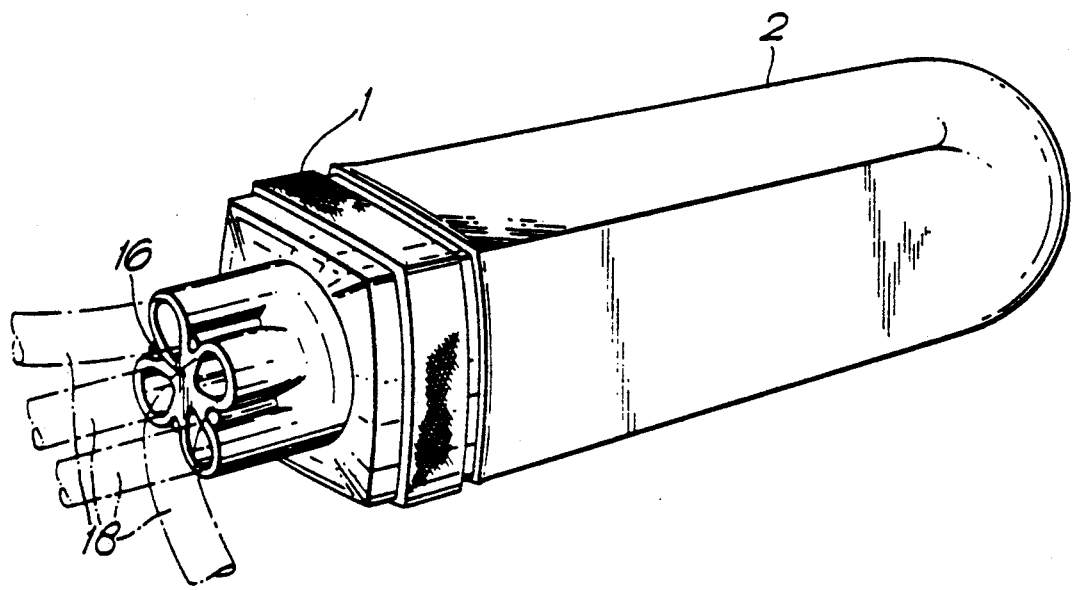
FIG. 6 shows a butt splice case employing branch-off clips.
Figure 7:
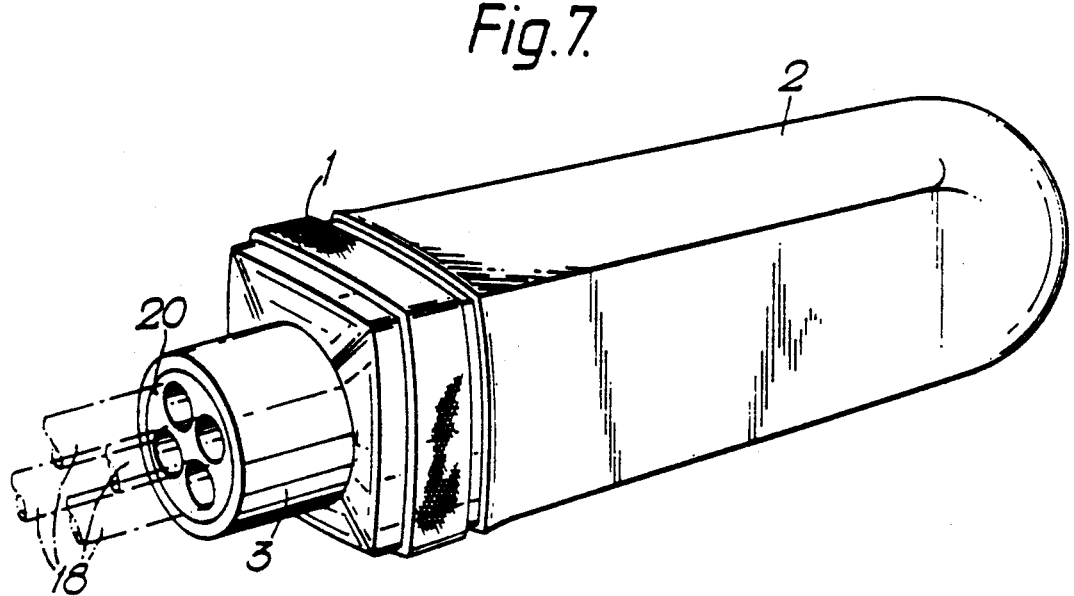
FIG. 7 shows the use of a prior art flexible seal in a butt splice case.

FIGS. 6 and 7 show alternative ways of using one large outlet to seal several cables. In FIG. 6 a four legged branch-off clip or clips 16 is used, and in FIG. 7 a flexible seal 20 (such as that disclosed in GB 2124439) is used around the cables to change their combined re-entrant cross-sectional shape into a circular shape compatible with the circular shape of the outlet 3. As before, the outlets 3 are preferably heat-shrinkable, especially by electrical power.

The base and the hollow cover may be attached together as follows.

An O-ring may be used to provide a seal between the two parts which are mechanically held together by a circular clamp. Alternatively, one may use a band of heat-shrinkable material (as shown in FIG. 5) around the join line between the base and the cover. The band is preferably shrinkable by electrical power. Electrical heat-shrinkability here is conveniently used in conjunction with electrically shrinkable outlets.

Discrete electrically shrinkable outlets may be used, shrunk into engagement with the cables and projections on the base. The outlets in this case may be pre-shrunk onto such projections, leaving only shrinkage onto the cables to be performed in the field. Alternatively, the entire installation of the outlets could be performed in the field.

FIG. 8 illustrates a preferred design of electrically shrinkable outlets, which is most applicable to discrete outlets. The material constituting the tubes 3 comprises a laminate of a recoverable conductive polymer composition 21 sandwiched between two perforated electrodes, shown dotted in FIG. 8a. The electrodes are perforated to allow them to collapse as the outlet shrinks. Each electrode is covered with a layer of insulation. In the embodiment illustrated, the tubular outlets 3 are formed from sheet material by bringing together opposing edges and clamping or bonding them at region 22. At the end regions, opposite layers of insulation 23a and 23b are removed to exposed the two electrodes. We prefer that the electrical heating provided by the conductive polymer composition is self-regulating, and therefore a polymer exhibiting a positive temperature coefficient of resistance (PTC) is preferably used. In order to improve the electrical performance of the system electrical contact to the electrodes is preferably made via a resistance material of constant-wattage behaviour. This is achieved by providing a tape 24 of zero temperature coefficient of resistance (ZTC) as illustrated. The power is supplied via conductors 19. When electrical power is applied current flows through the thickness of the material 21, causing it to become hot and thus to shrink. In the outlet illustrated the heater and the heat-shrinkable material are one and the same; it is possible however to provide a discrete heater in thermal contact with a heat-recoverable outlet. The outlet shown is provided with an internal layer of a sealing material (shown cross-hatched). The sealing material is preferably heat-activatable, and we prefer a hot-melt adhesive.

Figure 8B:
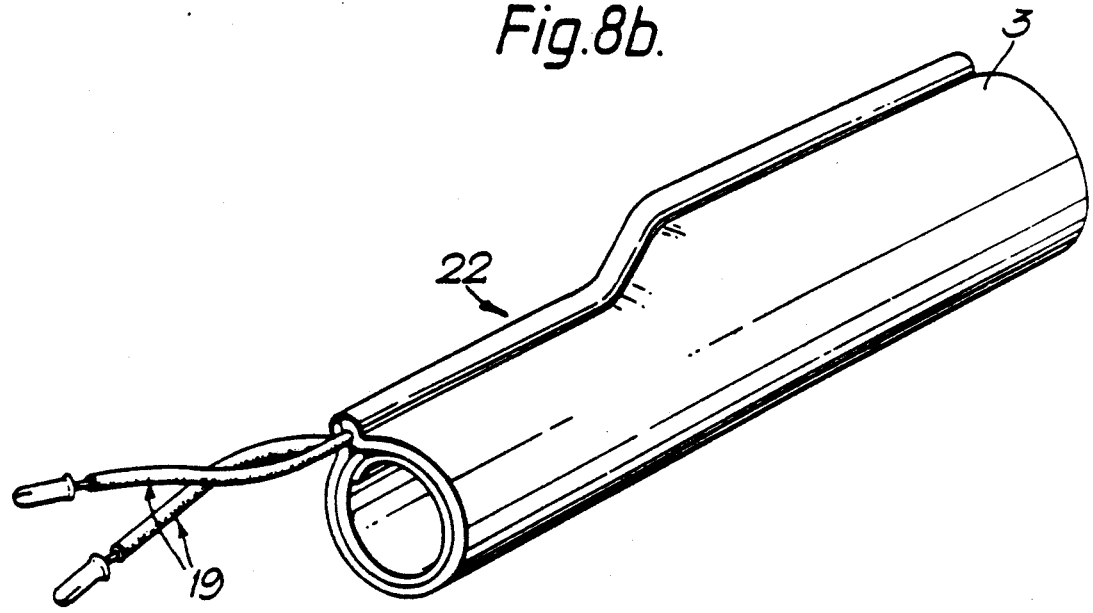

The outlet shown in FIG. 8b is stepped to accomodate the different sizes between the projection on the base and the cables it will carry.

Figure 9B:
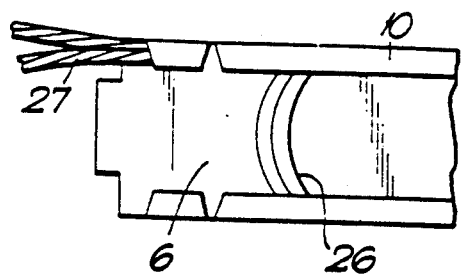

FIG. 9 shows in part rectangular trays 6 which may constitute an optical fibre organizer. Two fibre paths are illustrated. In FIG. 9a a bundle of fibres 25 is shown entering the tray along one long edge and leaving along an opposite long edge. The fibres follow a generally oval path on the tray, one end of the oval being shown at 26 where the paths of several fibres or several turns of the same fibre are illustrated. In FIG. 9b the fibre bundles 27 leave and enter along the same long edge. The arrangement of FIG. 9a is preferred.

Figure 10B:
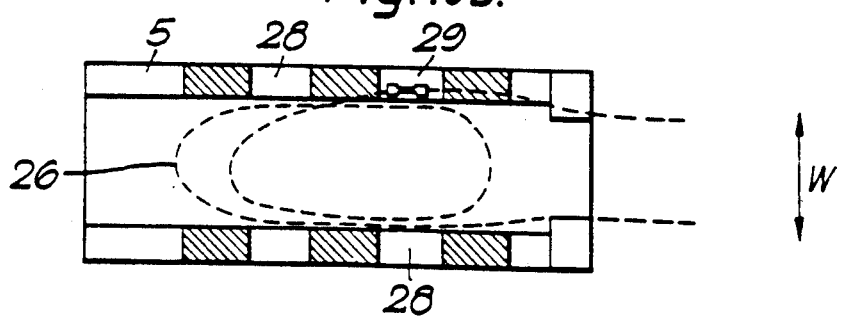

A design of a novel tray 5 (which may also be used in an in-line splice case) is shown in FIG. 10a in perspective view, and in FIG. 10b in plan view. The tray has a central first portion with retaining means in the form of a partial rim 10, and edge second portions 28 for storing splices 29 between fibres which are looped 26 on the tray between the rims 10. The portions 28 are preferably stepped below the general level of the tray in order to accomodate splices 29 which may include a small tube or other protective means of diameter greater than the fibre. This physical separation of the splices and the fibre loops simplifies installation and ease.

The dimension W should be at least equal to the minimum storage bend diameter of the fibre. This ensures that the fibre always follows a path of at least that diameter since the splice is accomodated on a wider portion of the tray. Each side of the tray shown may be designed for three splice holders (shown in FIG. 11, but omitted from FIG. 10) of a type that will accept two splices. Thus, the tray will accept twelve splices, and we prefer that a splice case can hold at least eight trays, making a total of 96 splices.

An advantage of the design of FIG. 10, over that of FIG. 1 is that the ratio between straight sections of fibre to bends is larger, and this allows greater storage. Also, the bend radius of the fibre does not depend on the location of the splice on the tray nor on the amount of fibre slack. Assymetric fibre lengths either side of the splice can be stored with easily.

Figure 11B:
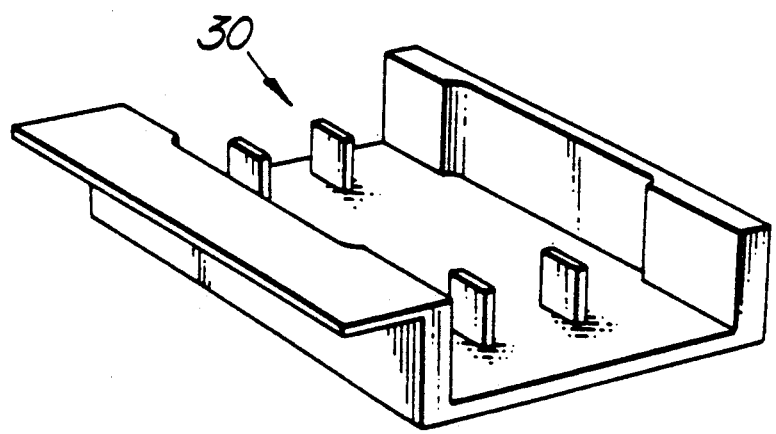

The splice holder can be positioned as desired along the portions 28 and the number of splice holders that can be accepted will of course depend on their size. FIG. 11 shows a type of splice holder 30 that can accept various different types of splices. The splice holder 30 may be integral with the tray, or it may be separate and attachable thereto by any suitable means, for example it may be an interference fit therein. In some circumstances it may simply rest on the tray. FIG. 11a shows a splice holder 30 with an insert 31, allowing positioning of two splices comprising a dumb-bell shaped splice tube within which the ends of the two splice fibres are held (such a tube 29 is shown in FIG. 10b). Removal of the insert 31, as in FIGS. 11b, allows other types of splice to be held.

FIGS. 12-14 disclose preferred embodiments of the invention.

FIG. 12 shows a splice enclosure for a butt splice, particularly between fibre optic cables. A base 32 is attached to a dome-shaped, or other cover 33 by means of a clamp or other device 34. Cables 35 can be seen to enter the enclosure through the base 32. The cables may contain many optical fibres, groups of which may be provided within protective tubes 36, or tape wrapped or twisted together etc. The fibres are then fed onto trays 37 where fibres of one cable 35 may be spliced to fibres of the other cable 35 (or to other fibers of the same cable). Some fibres may pass directly from one cable to the other where, for example, a branch splice is made at an intermediate point along a single cable. The cables 35 may include strength members 38 which may be secured directly or indirectly to the base 32.

If desired the trays may be attached to a carrier 39 which is in turn detachably attached to the base 32 by means of screw threads or other means 40, for example quick-release means.

The base 32 may be sealed to the cables by any suitable means 41, thereby providing together with the dome 33 a sealed enclosure around the trays and therefore around the splices in the conductors of the cable.

Means 41 preferably comprises a sealing material, for example an adhesive, mastic or gel block through which the cables 35 pass. The sealing material may be surrounded by a sleeve or other cover means 42. Such a sleeve 42 may be of the wrap-around design, opposing longitudinal edges thereof being held together by a channel or other means 43.

The enclosure can be removed substantially (and preferably entirely) from the splice as follows. Firstly, the means 41 is removed, for example aided by heating to soften any adhesive or other sealing material present. The clamp 34 and dome 33 may be removed from the base. The screws 40, or other means, are then undone and the base can be slid (vertically upwards as drawn) over the trays 37 and away from the spliced cables. The means 40 are preferably enclosed by the cover when attached to the base. The base can be seen to have a central hole larger enough to accept the trays 37. The carrier 39 may then be removed. It may have a split periphery allowing it to be removed laterally from the cables. Such a split periphery can be seen not to be disadvantageous since the carrier 39 lies wholly within the (preferably tubular) base, and therefore there is no split against which the sleeve 42 or dome 33 must seal. The carrier may therefore comprise two or more disengageable parts. It will be understood, therefore, that the base is preferably tubular and does not therefore have a peripheral split. In the absence of such a split, it will have to have a central (i.e. not breaking onto an edge) hole through which the trays can pass.

The enclosure can thus be dismantled and removed from the splice without disturbing the splices and lengths of fibre organized on the trays 37. If desired, of course the trays can also be removed. This can be done without signals carried out by the fibre being disturbed.

The various components of a preferred enclosure are shown in FIG. 13. Here the trays 37 can be seen in more detail hinged to a carrier 39 by hinges 44 which are preferably arranged in stepped fashion. A means 45 is visible for organizing fibres such that they do not follow a bend of tighter radius than their so-called minimum bend radius, commonly 37.5 mm. Such means 45 may comprise a substantially cylindrical projection from the base of the tray. Means 46 may be provided for holding individual fibre splices. Means 46 may comprise grooves, preferably aligned obliquely (say 45°) relative to the length of the trays.

Means 41 for sealing between the base and the cables is also shown in more detail. It preferably comprises a block of sealing material having laterally open channels 49 into which cables may be positioned. The block is then surrounded by heat-shrinkable sleeve 42, which overlaps the base 72. The sleeve is preferably electrically heat-shrinkable and preferably of wrap-around design and may be powered through busses 48 that extend along (or provide) opposed longitudinal closure rails 47 that may be held together by a closure channel or other means (43 in FIG. 12).

For improved sealing, or ease of installation or re-entry, the block 41 may be electrically-heatable, for example through power leads 50.

A preferred tray is shown in further detail in FIG. 14. The tray may have means 51, such a rim, optionally with extending tabs, that help to keep coiled fibre within the tray. Such means 51 may be provided in conjunction with means 52, such as indents, in the cylinder 45 such that fibre can be positioned around the cylinder but is unlikely accidentally to be removed. A cover or other means 53 is provided to prevent individual fibre splices from leaving the holder 46. The tray has an opening 54 through which fibres, or a bundles of fibres can enter.

In the design illustrated the amount of dead fibre required on the trays may be much less, say 20%, than on prior art designs. The dead length is, in general, the minimum length of fibre needed to install a splice protection anywhere on the splice holder, and is typically about 1 meter. The splice holders may be positioned on a special way on the tray, so that the fibres may be stored under the splice holder. This may result in a reduced number of loops of the fibres, and threfore a lower attenuation which is useful for long distance runs of fibres.

The ability for the enclosure to be removed whilst signals are still passing along the fibres make re-entry, repair an modifications to the enclosure of splice much simplier and cheaper. For example cable replacement or addition is simplified.

The oblique orientation of the splice holder 46 allows longer splice protection sleeves to be accomodated. Also, more splices can be accommodated than on many prior art designs.

For the avoidance of doubt it is noted that the invention provides a design of cable splice enclosure that can be substantially entirely removed from the splice without excessively interrupting signals transmitting by the conductors of the cable. Any one or more of the design features disclosed above may be chosen, and such features may be used in conjunction with any one or more of the features disclosed above as part of EP0159857 (Raychem).

We claim:

1. An enclosure capable of enclosing a butt splice between at least two optical fibre cables, which comprises:

a base having outlets through which respective cables can pass;

at least one optical fibre organizer capable of storing a optical fibre in a path from one of the outlets to another of the outlets, said path having a minimum radius of curvature no smaller than the minimum bend radius of said optical fibre; and a hollow cover capable of surrounding the organizer and when the cover is fixed to the base to close the enclosure; the base being removable from the splice by sliding over the organizer.

2. An enclosure according to claim 1, in which at least two outlets are formed at the base from subdivision of a single tubular member.

3. An enclosure according to claim 1, which additionally comprises means for forming a seal between the base and the cables.

4. An enclosure according to claim 2, in which the outlets are formed in a sealing material the sealing material being surrounded by a heat-shrinkable sleeve.

5. An enclosure according to claim 4, in which the sleeve comprises a conductive polymeric material that exhibits positive temperature coefficient of resistance behaviour.

6. An enclosure according to claim 1, in which the base has means for providing a reservoir for an encapsulant around a cable.

7. An enclosure according to claim 1, in which the optical fibre organizer comprises one or more optical fibre trays.

8. An enclosure according to claim 7, in which the trays are each hinged to a carrier, the hinge line running substantially perpendicular to the cables passing through the base.

9. An enclosure according to claim 7, in which the trays comprise a first portion which can accept a loop of optical fibre and a second portion which can accept an optical fibre splice.

10. An enclosure according to claim 9, in which the first portion has means for locating the loop adjacent an edge of the tray, and the second portion lies intermediate opposing edges of the tray.

11. An enclosure according to claim 1, in which the trays are attached to a carrier, which carrier is detachably attached to the base.

12. An enclosure according to claim 11, in which the detachable attachment is by means of a screw-thread.

13. An enclosure according to claim 11, in which the detachable attachment is by means of a quick-release device.

14. An enclosure according to claim 11, in which the detachable attachment is enclosed by the cover when attached to the base.

15. An enclosure capable of enclosing a butt splice between cables which comprises a base through which respective cables can pass;

at least one organizer capable of storing splices between conductors of the cable; and a hollow cover capable of surrounding the organizer when the cover is fixed to the base to close the enclosure; the base being removable from the splice without severing the spliced conductors.

* * * * *

UNITED STATES PATENT AND TRADEMARK OFFICE

CERTIFICATE OF CORRECTION

PATENT NO. : 5,222,183

INVENTOR(S) : Daems et al.

DATED : June 22, 1993

It is certified that error appears in the above-identified patent and that said Letters Patent is hereby corrected as shown below:

Cover Page, Abstract [57], line 4, replace "fire" by --fibre--.

Column 1, lines 26 to 27, replace "ac-comodation" by --ac-commodation--.

Column 5, line 61, replace "removably" by --removable--.

Column 7, line 65, replace "17" by --12--.

Column 9, line 53, delete "with".

Column 10, line 60, delete "out".

Column 11, line 10, replace "72" by --32--.

Column 11, line 36, replace "on" by --in--.

Column 11, line 39, replace "threfore" by --therefore--.

UNITED STATES PATENT AND TRADEMARK OFFICE
CERTIFICATE OF CORRECTION

PATENT NO. : 5,222,183

INVENTOR(S) : Daems et al.

DATED : June 22, 1993

It is certified that error appears in the above-identified patent and that said Letters Patent is hereby corrected as shown below:

```
Column 11, line 44, replace "an" by --and--.

Column 11, line 44, replace "of" by --or--.

Column 11, line 45, replace "simplier" by --simpler--.

Column 11, line 54, replace "transmitting" by
--transmitted--.

Claim 1, line 7, replace "a optical" by --an optical--.
```

Signed and Sealed this

Twenty-seventh Day of December, 1994

Attest:

BRUCE LEHMAN

*Attesting Officer*        *Commissioner of Patents and Trademarks*